United States Patent [19]

Kato et al.

[11] Patent Number: 4,952,548

[45] Date of Patent: Aug. 28, 1990

[54] CATALYST FOR REMOVING NITROGEN OXIDES

[75] Inventors: Yasuyoshi Kato; Kunihiko Konishi; Hiroshi Akama; Toshiaki Matsuda; Nobue Teshima; Fumito Nakajima; Tadaaki Mizoguchi; Masahiro Nitta, all of Kure, Japan

[73] Assignee: Babcock-Hitachi Kabushiki Kaisha, Tokyo, Japan

[21] Appl. No.: 259,178

[22] Filed: Oct. 18, 1988

[30] Foreign Application Priority Data

Oct. 26, 1987 [JP] Japan .................................. 62-270004

[51] Int. Cl.$^5$ .......................... B01J 21/06; B01J 23/22; B01J 23/28; B01J 23/30
[52] U.S. Cl. ..................................... 502/217; 502/309; 423/239
[58] Field of Search ............................... 502/309, 217; 423/239 A

[56] References Cited

U.S. PATENT DOCUMENTS

| | | | |
|---|---|---|---|
| 3,614,809 | 10/1971 | Hayes et al. | 502/527 X |
| 3,632,709 | 1/1972 | Hayes et al. | 423/213.2 X |
| 4,085,193 | 4/1978 | Nakajima et al. | 502/309 X |
| 4,466,947 | 8/1984 | Imanari et al. | 502/309 X |

FOREIGN PATENT DOCUMENTS

| | | | |
|---|---|---|---|
| 54-158372 | 12/1979 | Japan | 423/239 X |
| 55-114335 | 9/1980 | Japan | 423/239 A |

*Primary Examiner*—W. J. Shine
*Attorney, Agent, or Firm*—Fay, Sharpe, Beall, Fagan, Minnich & McKee

[57] ABSTRACT

A catalyst for removing nitrogen oxides contained in exhaust gases, particularly those containing vapor-form catalyst poisons, by catalytic reduction with ammonia, while retaining a high denitration performance for a long time, which catalyst comprises titanium oxide as a first component, molybdenum oxide and/or tungsten oxide as a second component and vanadium oxide and/or sulfate as a third component, the atomic ratio of the respective elements being Ti:Mo and/or W:V = 80–96.6:3–15:0.5–5, and the size of the crystallite of the titanium oxide according to Sherrer's equation being in the range of 185 Å to 300 Å in the direction of a plane (101) (interplanar spacing: d = 3.52 Å).

4 Claims, 2 Drawing Sheets

CATALYST FOR REMOVING NITROGEN OXIDES

BACKGROUND OF THE INVENTION

1. Field of the Invention

This invention relates to the so-called denitration catalyst for reducing nitrogen oxides contained in exhaust gases with ammonia to remove the oxides from the gases. More particularly it relates to a catalyst for removing nitrogen oxides, which is suitable for treating exhaust gases containing a large amount of volatile metal oxides.

2. Description of the Related Art

Nitrogen oxides ($NO_x$) exhausted from fixed generating sources such as various combustion equipments including boilers have formed a cause of air pollution together with sulfur oxides ($SO_x$). Various processes for removing $NO_x$ have been proposed, and among these, the so-called catalytic ammonia reduction denitration process of adding ammonia ($NH_3$) into exhaust gases, followed by contacting the mixture with a catalyst to reduce $NO_x$ into nitrogen has constituted a main current. As to the catalyst used in the above-mentioned process, it is necessary that the catalyst be not deteriorated by $SO_x$ contained in a large amount in the combustion gas of fuels such as petroleum, coal, etc. and also by ashes in the fuels. As catalysts satisfying these requirements, various catalysts based on titanium oxide have been developed and broadly used (see Japanese patent application laidopen Nos. Sho 50-128681/1975 and Sho 53-281485/1978). These catalysts have been obtained by adding compounds of transition metal elements such as vanadium (V), molybdenum (Mo), tungsten (W), iron (Fe), chromium (Cr), etc. to metatitanic acid or titanium oxide, followed by calcining the mixture. They have a superior activity and life as a catalyst for treating combustion exhaust gases from usual petroleum or coal.

However, in the case of combustion exhaust gases of low quality coal or in the case of boilers provided with an ash-circulating line very often employed in Europe, a large amount of volatile oxide vapor of heavy metals, etc. is contained in exhaust gases and when such exhaust gases are treated, the catalyst activity is rapidly deteriorated. FIG. 2 shows a flow diagram of a conventional boiler system having an ash-circulating line. Ashes collected at electrostatic precipitator 7 are recycled through ash-circulating line 9 to boiler furnace 1. Numeral 10 shows denitration apparatus. Numerals 2, 6 and 8 show economizer, air-preheater and chimney, respectively. In the case of the combustion system described above provided with such an ash-circulating line 9, there has been raised such a problem that elements contained in the mineral substances in coal such as lead (Pb), selenium (Se), arsenic (As), cadmium (Cd), zinc (Zn), etc. are transferred into exhaust gases in the form of solid substances or vapors during the process wherein ashes are melted inside a boiler furnace 1 and recovered as slag, and are present in the form of metal vapor in a high concentration upstream of an air preheater 6 provided with a denitration apparatus 10 (H. Brunisark et al., Environmental Technology, Letters; 5, 7-22 (1987)) so that the nitration catalyst is poisoned by such vapor.

SUMMARY OF THE INVENTION

The object of the present invention is to provide a catalyst for removing nitrogen oxides capable of preventing deterioration of denitration catalysts due to vapor of heavy metal compounds contained in exhaust gases, which deterioration has not been taken into consideration in the case of conventional denitration catalysts.

The present inventors have made extensive research in order to solve the above-mentioned problems and have achieved the present invention.

The present invention resides in;

a catalyst for removing nitrogen oxides contained in exhaust gases by catalytic reduction with ammonia, which catalyst comprises titanium oxide as a first component, molybdenum oxide and/or tungsten oxide as a second component, and vanadium oxide and/or vanadium sulfate as a third component, the atomic ratio of the respective elements being Ti:Mo and/or W:V = 80-96.5: 3-15:0.5-5, and the size of the crystallite of the titanium oxide according to Sherrer's equation being in the range of 185Å to 300Å in the direction of a plane (101) (interplanar spacing d=3.52Å).

Deterioration of conventional catalysts due to the above-mentioned vapor-form catalyst poison is considered to be due to the fact that the catalyst poison molecules are adsorbed onto $TiO_2$. When the catalyst composition and the size of the crystallite of $TiO_2$ are each limited to within a specified range as in the present invention, the adsorption sites of catalyst poison present on $TiO_2$ are covered by Mo oxide or W oxide so that the catalyst poison is prevented from being adsorbed onto $TiO_2$, whereby it is possible to notably reduce the activity reduction of the catalyst due to vapor-form catalyst poison.

Vanadium oxide highly dispersed on titanium oxide is activated to give active sites effective for promoting the denitration reaction i.e. reaction of $NO_x$ with $NH_3$, but it is considered that when vapor-form catalyst poison is adsorbed onto this titanium oxide, the properties of titanium oxide are changed to reduce its activity. According to the catalyst of the present invention, the surface of titanium oxide is coated by Mo or W oxide in proper quantities to prevent the above-mentioned deterioration.

In order to coat the surface of titanium oxide by Mo or W oxide in proper quantities, it is necessary that the size of titanium oxide crystal and the quantity of Mo or W oxide coating its surface be each within a specified range. Further, it is necessary to employ such a method that Mo or W oxide is adsorbed in a monomolecular layer. Further, in order to retain the catalyst activity highly, the respective surface areas of V oxide and Ti oxide forming active sites also have optimum values. In order to satisfy these conditions, the catalyst is prepared so that the above-mentioned composition and size of crystallite of titanium oxide can be afforded.

DETAILED DESCRIPTION OF PREFERRED EMBODIMENTS

Figure 1:
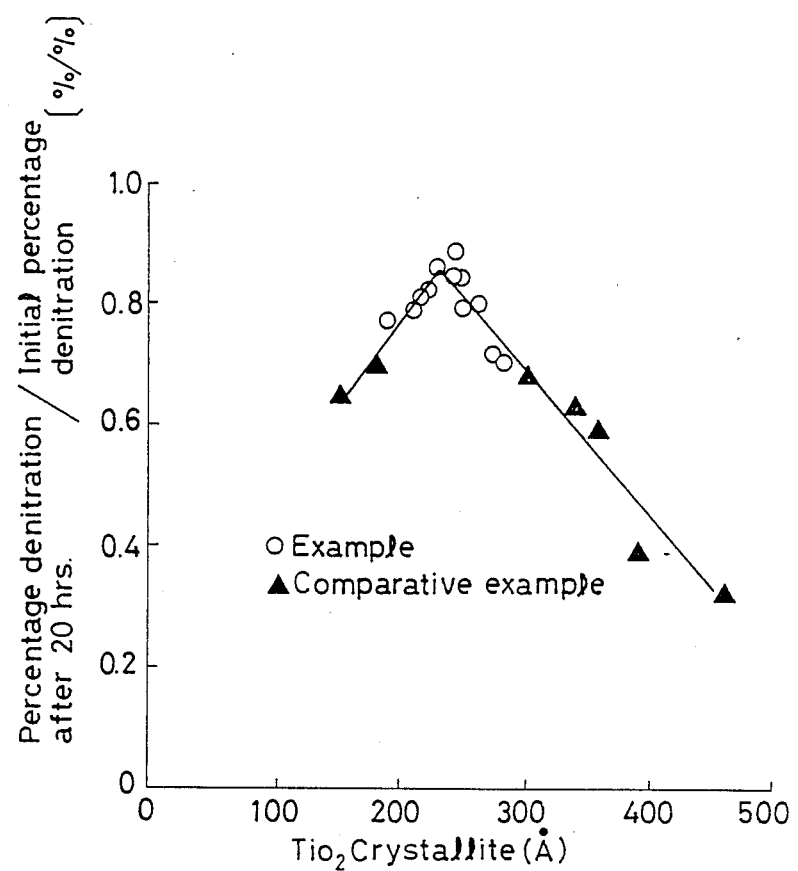
FIG. 1 shows a chart illustrating the relationship between the size of the crystallite of $TiO_2$ and the catalyst performance.
Figure 2:
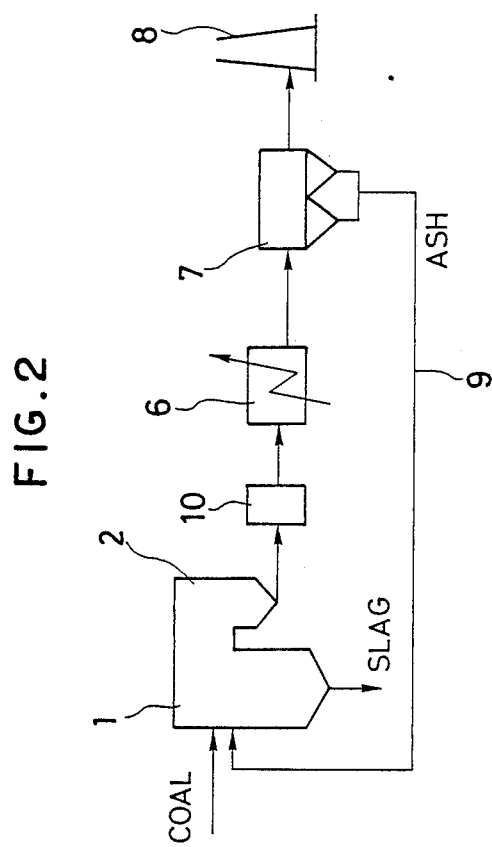
FIG. 2 shows a flow diagram of a boiler system having an ash-circulating line.

It is necessary for the catalyst of the present invention that the catalyst comprise titanium oxide ($TiO_2$) as its first component, molybdenum (Mo) oxide and/or tungsten (W) oxide as its second component and vanadium (V) oxide and/or vanadium sulfate as its third component, the atomic ratio of the respective elements being in the following range:

Ti:Mo and/or W:V = 80.0–96.5:3–15:0.5–5.0.

Further, it is also necessary for the titanium oxide used in the present invention that the size of crystallite, according to the following Sherrer's equation be within a range of 185Å to 300Å in the direction of a plane (101) (interplanar spacing d = 3.52Å):

$$D = \frac{0.94 \lambda}{(B_{\frac{1}{2}} - b) \cos \theta}$$

D: size of crystallite
λ: wavelength of X-rays (Å)
$B_{\frac{1}{2}}$: half width of diffraction peak (radian)
θ: Bragg's diffraction angle (radian)
b: correction constant depending on device (radian)

As the raw material for the first component of the catalyst of the present invention, metatitanic acid (TiO(OH)$_2$), orthotitanic acid (Ti(OH)$_4$), titanium oxide calcined at a low temperature and having a specific surface area of 200 m$^2$/g or more, colloidal titania, etc. may be used. As the raw material for the second component, oxyacid of Mo or W or ammonium salt thereof may be preferably used. As the third component, ammonium metavanadate (NH$_4$VO$_3$), 1 sulfate (VOSO$_4$), etc. may be used.

As to the preparation of the catalyst, for example, the first, second and third components may be kneaded on heating in the presence of water, followed by drying the resulting mixture, precalcining it at 300° to 500° C. in the atmosphere, molding the resulting material into plate form, honeycomb form or granular form in a conventional wet manner or dry manner and calcining the molded material at 500° to 600° C. in the atmosphere. In order to improve the strength of the product, inorganic fibers such as those of ceramics may also be added in advance of the molding or porous metal substrates may be used as a core material. Further, various inorganic binders may also be kneaded at the molding step or may be impregnated after molding.

According to the above-mentioned preparation, titanium oxide in the catalyst is usually of anatase type, but may also be of rutile type or brookite type.

In general, titanium oxide of rutile type is formed by high temperature calcination and often has a low specific surface area due to growth of its crystals, whereas as in the case of titanium oxide of anatase type, a product having a large specific surface area and a high activity is easily obtained; hence the latter is preferred. Of course, if the size of the crystallite is within the size range of the present invention, even titanium oxide of rutile type can obtain the same effectiveness as that of titanium oxide of anatase type. Further, even when a portion of titanium oxide is that of rutile type, the same effectiveness is obtained.

The present invention will be described in more detail by way of Examples. Percentages in Examples are by weight.

EXAMPLE 1

To a slurry (1 Kg) containing metatitanic acid (30%) in terms of TiO$_2$ and sulfuric acid (2.7%) were added ammonium metavanadate (NH$_4$VO$_3$) (20.4 g) and ammonium molybdate (3(NH$_4$)$_2$O·7MoO$_3$·4H$_2$O) (77.0 g), followed by kneading the mixture on heating by means of a kneader to obtain a paste having a water content of 34% by weight, granulating this paste into granules in a cylindrical form of 3 mmφ, drying the granules at 150° C., grinding them into finely-divided particles of 100 meahses or less by a hammer mill, molding the particles into tablets of 13 mm in outer diameter and 5 mm thick, grinding the tablets into particles of 10 to 20 meshes, placing them in a crucible and calcining at 550° C. for 2 hours in the air to obtain a catalyst of the present invention.

EXAMPLE 2

A catalyst was obtained in the same manner as in Example 1 except that the slurry of metatitanic acid in Example 1 was replaced by a colloid titania containing 30% of titanium oxide.

COMPARATIVE EXAMPLE 1

A catalyst was obtained in the same manner as in Example 1 except that the slurry of metatitanic acid in Example 1 was replaced by a material obtained by previously calcining the slurry of metatitanic acid at 500° C.

COMPARATIVE EXAMPLE 2

A material (50 g) obtained by grinding a spherical TiO$_2$ carrier of 5 mm in diameter (specific surface area: 40 m$^2$/g and pore volume: 0.27 ml/g) into particles of 10 to 20 meshes was impregnated in a solution (20 ml) of ammonium metavanadate (2.4 g), ammonium molybdate (6.0 g) and oxalic acid ((COOH)$_2$·2H$_2$O) (3.7 g) dissolved in water, followed by drying the resulting material at 150° C. for one hour and then calcining the resulting material at 550° C. for 2 hours to obtain a catalyst.

EXAMPLE 3

A catalyst was obtained in the same manner as in Example 1 except that the calcination temperature of the catalyst of Example 1 was changed to 500° C.

COMPARATIVE EXAMPLE 3

A catalyst was obtained in the same manner as in Example 2 except that the calcination temperature of the catalyst of Example 2 was changed to 500° C.

EXAMPLES 4–7

A catalyst was obtained in the same manner as in Example 1 except that the amount of ammonium molybdate added, of Example 1 was varied to 21.4 g, 36.4 g, 52.1 g or 122.6 g.

EXAMPLES 8–12

A catalyst was obtained in the same manner as in Example 1 except that the amount of ammonium metavanadate added, of Example 1 was varied to 2.5 g, 4.9 g, 10.0 g, 15.1 g or 25.8g.

COMPARATIVE EXAMPLE 4

A catalyst was obtained in the same manner as in Example 1 except that ammonium molybdate of Example 1 was not added.

COMPARATIVE EXAMPLE 5

A catalyst was obtained in the same manner as in Example 1 except that the amount of ammonium molybdate added, of Example 1 was changed to 174.2 g.

COMPARATIVE EXAMPLE 6

A catalyst was obtained in the same manner as in Example 1 except that ammonium metavanadate of Example 1 was not added.

COMPARATIVE EXAMPLE 7

A catalyst was obtained in the same manner as in Example 1 except that the amount of ammonium metavanadate added, of Example 1 was changed to 31.6 g.

EXAMPLE 13

A catalyst was obtained in the same manner as in Example 1 except that ammonium molybdate of Example 1 was replaced by ammonium paratungstate $((NH_4)_6 \cdot W_7O_{24} \cdot 6H_2O)$ (117.6 g), oxalic acid (46.2 g) was added thereto, and a solution of the mixture dissolved in water (200 ml) was used.

TEST EXAMPLE 1

The sizes of the titanium oxide crystallites of the catalysts obtained in Examples 1-13 and Comparative examples 1-7 were measured using the peak of the interplanar spacing $d=3.52Å$. The measurement method was as follows and the sizes of the crystallites were calculated according to the above Sherrer's equation:

MEASUREMENT CONDITIONS

Device: RAD-B (tradename of device manufactured by Rigaku Denki Company)
Target: Cu
Output: 50KV-160mA
Scanning speed: 2 deg/min.
The results are shown in Table 2.

TEST EXAMPLE 2

The catalysts of Examples 1-13 and Comparative examples 1-7 were subjected to denitration reaction using a synthesized exhaust gas of coal combustion containing 14 ppm of arsenious acid ($As_2O_3$) vapor as a volatile catalyst poison, under conditions shown in Table 1 and for 20 hours to observe the change in the denitration performance of the catalysts and the durability thereof. The results are shown in Table 1.

TABLE 1

| Item | Conditions |
| --- | --- |
| Catalyst form | 10~20 mesh |
| SV | 60,000 h$^{-1}$ |
| Temperature | 350° C. |
| Gas composition | |
| NO | 200 ppm |
| NH$_3$ | 240 ppm |
| SO$_2$ | 500 ppm |
| SO$_3$ | 50 ppm |
| As$_2$O$_3$ | 14 ppm |
| CO$_2$ | 12 % |
| H$_2$O | 12 % |
| O$_2$ | 3 % |
| N$_2$ | balance |

*SV: Space velocity

TABLE 2

| Catalyst | Composition (atomic %) | | | Size of TiO$_2$ crystallite (Å) | Percentage denitration (%) | |
| --- | --- | --- | --- | --- | --- | --- |
| | Ti | Mo or W | V | | Initial | After 20 h durability test |
| Example | | | | | | |
| 1 | 86 | 10 | 4 | 243 | 99.8 | 87.0 |
| 2 | " | " | " | 246 | 97.8 | 82.4 |
| 3 | " | " | " | 190 | 99.9 | 77.0 |
| 4 | 93 | 3 | " | 280 | 99.8 | 69.8 |
| 5 | 91 | 5 | " | 266 | 99.6 | 79.8 |
| 6 | 89 | 7 | " | 250 | 99.6 | 84.0 |
| 7 | 81 | 15 | " | 260 | 98.3 | 84.0 |
| 8 | 89.5 | 10 | 0.5 | 210 | 92.7 | 73.0 |
| 9 | 89 | " | 1 | 215 | 98.0 | 79.8 |
| 10 | 88 | " | 2 | 223 | 99.4 | 83.2 |
| 11 | 87 | " | 3 | 230 | 99.6 | 85.6 |
| 12 | 85 | " | 5 | 276 | 98.0 | 69.8 |
| 13 | 86 | " | 4 | 265 | 98.8 | 77.0 |
| Comp. ex. | | | | | | |
| 1 | 86 | 10 | 4 | 342 | 97.8 | 61.6 |
| 2 | 92 | 5 | 3 | 460 | 92.2 | 36.0 |
| 3 | 86 | 10 | 4 | 154 | 99.4 | 64.0 |
| 4 | 96 | 0 | " | 390 | 96.0 | 37.1 |
| 5 | 76 | 20 | " | 301 | 99.1 | 68.3 |
| 6 | 90 | 10 | 0 | 185 | 87.4 | 60.9 |
| 7 | 84 | " | 6 | 365 | 79.8 | 46.7 |

In Table 2, when Examples 1 and 2 are compared with Comparative examples 1 and 2, any of the initial performances are almost the same, but as to the performances after 20 hours' durability test, those of the Examples are superior. Also, when Examples 1, 2 and 3 are compared with Comparative example 3, the same phenomenon is observed. In view of such comparisons, the sizes of the TiO$_2$ crystallites of such Examples having a superior durability are 243Å, 246Å and 190Å; hence it is noted that the sizes of TiO$_2$ crystallites within such a range is related to the higher durability.

This almost applies also to comparison of Examples 4-13 with Comparative examples 4-7.

In FIG. 1, the abscissa axis shows the size of TiO$_2$ crystallite and the ordinate axis shows a ratio of the percentage denitration after 20 hours' durability test to the initial percentage of denitration as an index of durability, and these values of Examples 1-13 and Comparative examples 1-7 are plotted in FIG. 1. As seen from FIG. 1, the size of TiO$_2$ crystallite in which the durability is enhanced has an optimum value and its suitable range is 185 to 300Å.

Further, it is seen from the test results of Examples 1 and 4-7 and Comparative examples 4 and 5 that the quantity of Mo added is suitable to be in the range of 3 to 15 atomic %, and if it is less than 3 atomic %, the size of TiO$_2$ crystallite increases to reduce the durability, while if it exceeds 15 atomic %, the initial performance is reduced.

Further, it is seen from the test results of Examples 1 and 8-12 and Comparative examples 6 and 7 that the amount of V added is suitable to be in the range of 0.5 to 5 atomic %, and if it is less than 0.5 atomic %, the initial performance is reduced, while if it exceeds 5 atomic %, the durability is reduced.

Further, it is seen from Example 13 that even when molybdenum oxide is replaced by tungsten oxide, the same effectiveness is obtained.

EXAMPLE 14

To a metatitanic acid slurry (50 Kg) containing 30% of TiO$_2$ were added ammonium metavanadate (1.02 Kg) and ammonium molybdate (3.81 Kg), followed by kneading the mixture on heating by means of a kneader and vaporizing water to obtain a paste containing 34% of water. This paste was then molded into a columnar shape of 3 mm in outer diameter by means of an extrusion-granulator, followed by drying the molded material by means of a fluidized bed dryer, further precalcining the dried material at 350° C. for 2 hours, grinding the resulting granules into particles 90% or more of which pass 100 mesh sieve, by means of a hammer mill, adding to the particles, water, aluminum sulfate (Al$_2$(SO$_4$)$_3$) (6%) and silica-alumina inorganic fibers (15%), again kneading the mixture by means of a kneader to form a catalyst paste. A substrate obtained by processing a band steel of SUS 304 of 500 mm wide and 0.3 mm thick into a metal lath, followed by spray-coating molten aluminum thereon, are coated with the above-mentioned catalyst paste by means of a roller press to obtain a plate-form molded product of 0.98 mm thick. This molded product was then air-dried at room temperature for 12 hours, followed by calcining it at 500° C. for 2 hours to obtain a catalyst plate. The TiO$_2$ crystallite of the catalyst had a size of 196Å.

Materials obtained by cutting the catalyst plate into 100 mm square were placed in a flue (temperature: about 370° C.) for boiler so that the catalyst surface could be parallel to the gas flow direction, to observe the durability of the catalyst. As a result, almost neither reduction in the catalyst activity nor catalyst attrition due to ashes was observed after lapse of about 1,000 hours.

As described above, the catalyst of the present invention is also practically far superior.

It is possible for the catalyst of the present invention to retain a high denitration performance for a long time even in exhaust gases containing vapor-form catalyst poisons including arsenic oxide and lead oxide.

What we claim is:

1. A catalyst for removing nitrogen oxides from exhaust gases which include catalyst-deteriorating heavy metals, said catalyst comprising:
    a first component comprising titanium oxide in crystallite form having a size of 185 Å to 300 Å, and being in the direction of a plane (101), with interplanar spacing of about 3.52 Å;
    a second component comprising molybdenum oxide and/or tungsten oxide;
    a third component comprising vanadium oxide and/or sulfate, the atomic ratios of Ti:Mo and/or W:V being 80–96.5:3–15:0.5–5, said TiO$_2$ crystallite having a size which prevents catalyst deterioration; and,
    adsorption sites on said titanium oxide crystallite which are covered with molybdenum oxide to prevent adsorption of heavy metals onto said titanium oxide crystallite, whereby the deterioration of said catalyst by the exhaust gas heavy metals is reduced.

2. A catalyst, according to claim 1, wherein a monomolecular layer of molybdenum oxide is absorbed onto said titanium oxide crystallite.

3. A catalyst for removing nitrogen oxides from exhaust gases which include catalyst-deteriorating heavy metals, said catalyst comprising:
    a first component comprising titanium oxide in crystallite form having a size of 185 Å to 300 Å, and being in the direction of a plane (101), with interplanar spacing of about 3.52 Å;
    a second component comprising molybdenum oxide and/or tungsten oxide;
    a third component comprising vanadium oxide and/or sulfate, the atomic ratios of Ti:Mo and/or W:V being 80–96.5:3–15:0.5–5, said TiO$_2$ crystallite having a size which prevents catalyst deterioration; and,
    adsorption sites on said titanium oxide crystallite which are covered with tungsten oxide to prevent adsorption of heavy metals onto said titanium oxide crystallite, whereby the deterioration of said catalyst by the exhaust gas heavy metals is reduced.

4. A catalyst, according to claim 3, wherein a monomolecular layer of tungsten oxide is adsorbed on said titanium oxide crystallite.

* * * * *